(12) United States Patent
Guo et al.

(10) Patent No.: US 11,956,726 B1
(45) Date of Patent: Apr. 9, 2024

(54) DYNAMIC POWER CONTROL METHOD AND SYSTEM FOR RESISTING MULTI-USER PARAMETER BIASED AGGREGATION IN FEDERATED LEARNING

(71) Applicant: SHANDONG UNIVERSITY, Jinan (CN)

(72) Inventors: Shuaishuai Guo, Jinan (CN); Anbang Zhang, Jinan (CN); Yanhu Wang, Jinan (CN); Shuai Liu, Jinan (CN)

(73) Assignee: SHANDONG UNIVERSITY, Jinan (CN)

( * ) Notice: Subject to any disclaimer, the term of this patent is extended or adjusted under 35 U.S.C. 154(b) by 0 days.

(21) Appl. No.: 18/531,764

(22) Filed: Dec. 7, 2023

(30) Foreign Application Priority Data

May 11, 2023 (CN) .......................... 202310528588.7

(51) Int. Cl.
*H04W 52/02* (2009.01)
(52) U.S. Cl.
CPC ... *H04W 52/0258* (2013.01); *H04W 52/0229* (2013.01)
(58) Field of Classification Search
CPC .................. H04W 52/0258; H04W 52/0229
See application file for complete search history.

(56) References Cited

U.S. PATENT DOCUMENTS

| | | | |
|---|---|---|---|
| 2022/0237508 A1* | 7/2022 | Shaloudegi | G06N 3/045 |
| 2022/0391696 A1 | 12/2022 | Sahin et al. | |
| 2023/0073743 A1* | 3/2023 | Muddle | G06F 21/6245 |

(Continued)

FOREIGN PATENT DOCUMENTS

| | | |
|---|---|---|
| CN | 113810086 A | 12/2021 |
| CN | 114189899 A | 3/2022 |
| CN | 114580498 A | 6/2022 |

OTHER PUBLICATIONS

Xiaowen Cao, Research on Over-the-Air Computation for Mobile Edge Networks Information Technology Collection of CDFD p. 75-92 Publication date: Jan. 15, 2023.

(Continued)

*Primary Examiner* — Dominic E Rego
(74) *Attorney, Agent, or Firm* — CBM PATENT CONSULTING, LLC (57) ABSTRACT

A dynamic power control method and system for resisting multi-user parameter biased aggregation in federated learning are provided; the method includes: (1) establishing a federated learning system model for resisting parameter biased aggregation; (2) constructing a 5 corresponding objective function based on a training purpose of the federated learning system model; (3) introducing, according to the established federated learning system model, a power control factor for resisting user biased gradient aggregation, and determining a corresponding over-the-air computation communication model; (4) processing a signal by a receiver using an incoherent energy detection method without cooperation between the receiver and a transmitter; and (5) determining a federated learning security mechanism method based on resistance against parameter biased aggregation, and completing an updating training process of the federated learning system model.

9 Claims, 6 Drawing Sheets

(56) References Cited

U.S. PATENT DOCUMENTS

| | | | | |
|---|---|---|---|---|
| 2023/0080737 A1* | 3/2023 | Fang | ................... | G06N 3/044 |
| | | | | 706/12 |
| 2023/0132213 A1* | 4/2023 | Lee | ................... | G06N 3/098 |
| | | | | 706/12 |
| 2023/0180152 A1* | 6/2023 | Balevi | ................... | H04W 4/06 |
| | | | | 455/518 |
| 2023/0214667 A1* | 7/2023 | Hoque | ................ | G06N 3/0464 |
| | | | | 706/12 |
| 2023/0214713 A1* | 7/2023 | Choi | ................... | G06N 20/00 |
| | | | | 706/10 |
| 2023/0275789 A1* | 8/2023 | Li | ................... | H04L 25/03343 |
| | | | | 375/262 |
| 2023/0297845 A1* | 9/2023 | Gyllenhammar | ......... | G06F 8/65 |
| | | | | 717/168 |
| 2023/0422054 A1* | 12/2023 | Jeon | ................... | G06N 3/04 |
| 2024/0028870 A1* | 1/2024 | Goodsitt | ................ | G06N 3/045 |

OTHER PUBLICATIONS

Xiaowen Cao, et al., Optimized Power Control Design for Over-the-Air Federated Edge Learning IEEE Journal on Selected Areas in Communications p. 342-356 Publication date: Feb. 31, 2022.

\* cited by examiner

DYNAMIC POWER CONTROL METHOD AND SYSTEM FOR RESISTING MULTI-USER PARAMETER BIASED AGGREGATION IN FEDERATED LEARNING

CROSS-REFERENCE TO RELATED APPLICATIONS

This application claims priority to Chinese Patent Application Ser. No. 6 CN2023105285887 filed on 11 May 2023.

FIELD OF THE INVENTION

The present disclosure relates to a dynamic power control method and system for resisting multi-user parameter biased aggregation in federated learning, and belongs to the field of distributed machine learning.

BACKGROUND OF THE INVENTION

With the great improvement of computing power and storage capacity of modern intelligent terminals, federated learning, a novel distributed machine learning algorithm, has emerged, which provides an effective way for privacy computing. Conventional machine learning requires training data to be centralized on servers and models to be established, while federated learning can build a global model without data sharing, which does not involve the transmission of data, thus greatly ensuring the data privacy security of each participant. [Brendan McMahan H, Moore E, Ramage D, et al. Communication-efficient learning of deep networks from decentralized data[J]. arXiv e-prints, 2016: arXiv: 1602.056291.].

In federated learning, when edge devices and servers periodically transmit model parameters in uplink and downlink communication, the edge devices participating in the learning process share the same wireless medium to transmit local updates to an edge server, but limited wireless spectrum and power resources may cause serious congestion, thus leading to communication bottlenecks in federated learning. Large-scale clients easily impose a huge bandwidth burden on a communication network. In order to solve this problem, a promising solution is to perform computations required by federated edge learning and to use an over-the-air computation (AirComp) method of signal superposition of wireless multiple-access channels to effectively reduce communication overheads and achieve the effect of fast convergence of a global model. [Zhu G, Wang Y, Huang K. Broadband analog aggregation for low-latency federated edge learning[J]. IEEE Transactions on Wireless Communications, 2019, 19(1): 491-506.]. However, because of multi-path channels, power misalignments, and time synchronization errors in actual situations, it is not a simple task to study relevant solutions for over-the-air computation, and channel state information (CSI) is required to be available at the servers or the edge devices. In view of this problem, an non-coherent detection method is used for processing at the receivers to achieve better effects.

In the context of using the over-the-air computation method, the communication overhead problem has been effectively solved, but whether the multi-user parameter aggregation has a significant deviation to the training of the global model becomes the focus of the study. Previous studies have shown that some participants may provide biased gradient parameter indexes or make errors in the transmission process. In the presence of multiple participants, aggregation results significantly differ, which will seriously affect the aggregation of model parameters and the quality of training. Moreover, these users may even dominate the federated learning training process in the process of parameter aggregation, which results in inconsistent convergence directions between the local models and the global optimal model and affects the performance of the global model. [Bagdasaryan E, Veit A, Hua Y, et al. How to backdoor federated learning[C] International Conference on Artificial Intelligence and Statistics. PMLR, 2020: 2938-2948.]. Most of the existing work focuses on the direct convergence with the global model, without considering the rationality of the global model.

The current leading direction is to seek the best way to manage wireless networks in response to specific needs of federated learning. Generally, each participant has the same power configuration. In this power configuration, the participants who falsely report test gradient indexes do not have training options, and cannot focus on controlling the impact of large deviation gradient indexes on the performance of the federated learning models, which is a critical issue to be addressed. Therefore, considering the situation of spontaneous power control by users, a higher transmitted power is dynamically adjusted for a part of the aggregation where user parameters have a greater impact on model convergence to offset the impact of the user parameters, which are opposite to the model convergence direction in the parameter aggregation, on the whole model so as to achieve faster convergence and better model accuracy.

SUMMARY OF THE INVENTION

In view of the deficiencies of the existing technology, the present disclosure provides a dynamic power control method for resisting multi-user parameter biased aggregation in federated learning.

In particular, the present disclosure first considers communication overheads in large-scale parameter transmission in federated learning, and uses a sign stochastic gradient descent algorithm in the form of majority vote, which has the advantage of substantially compressing communication between edge devices and servers in both directions. It is considered that data is transmitted repeatedly, and correct transmission parameters are determined based on a majority rule. In general, errors always occur locally, and therefore, fusing multiple parameters is a good method to reduce errors, which is the idea of majority vote. When gradient signs are aggregated, because of Gaussian noise in the communication process and the gradient indexes with the large deviation uploaded by users, it is contrary to the global convergence, which results in a large change in the form of majority vote after aggregation. Therefore, it is considered that according to the comparison between gradient signs trained by the user and signs of a global gradient, the transmitted power of the user providing the gradient index with a large deviation is dynamically adjusted based on a trade-off probability of two parameters to ensure a small proportion in the future aggregation so as to offset interference of multi-user aggregation, thereby reducing the impact on this aspect, and further increasing the convergence speed and training accuracy of the algorithm under the condition that the communication efficiency is satisfied.

The present disclosure also provides a dynamic power control system for resisting multi-user parameter biased aggregation in federated learning.

Technical Solution of the Present Disclosure:

A dynamic power control method for resisting multi-user parameter biased aggregation in federated learning includes the following specific implementation steps:

(1) establishing a federated learning system model for resisting parameter biased aggregation;

(2) constructing a corresponding objective function based on a training purpose of the federated learning system model;

(3) introducing, according to the federated learning system model established in step (1), a power control factor for resisting user biased gradient aggregation, and determining a corresponding over-the-air computation communication model;

(4) processing the signal by the receiver using the non-coherent energy detection method without cooperation between the receiver and a transmitter; and (5) determining, according to the method in step (4), a federated learning security mechanism method based on resistance against parameter biased aggregation, and completing an updating training process of the federated learning system model.

Preferably, according to the present disclosure, the dynamic power control method is applied to a federated learning security mechanism system. The federated learning security mechanism system includes K users, an edge server, S orthogonal frequency division multiplexing (OFDM) symbols, and R active sub-carriers.

Each user is connected to a central server.

Training data of all the users are set to be multi-label data from the same feature space, and the total number of labels is L.

Each local data point of any user has the same type of label, local data of a marked data sample on the $k^{th}$ user is represented by $D_k$, $(x_l, y_l) \in D_k$, $x_l$ and $y_l$ represent the data sample and the corresponding label, respectively, and the sum of the local data of all the users is D, satisfying: $\Sigma_{k=1}^{K} D_k = D$.

Preferably, according to the present disclosure, in step (1), the federated learning system model for resisting parameter biased aggregation includes a transmitter network, a wireless channel, and a receiver network. The transmitter network includes one-bit quantization, local user parameter updating portion, and user dynamic power control block. The receiver network includes non-coherent energy detector.

The one-bit quantization simplifies the sign of local gradient parameters. The local user parameter updating portion is configured to realize a local updating training process of the federated learning system model. The user dynamic power control block dynamically controls the transmitted power according to the degree of contribution of each user to the convergence of the federated learning system model, so as to offset the deviation of parameter aggregation in the wireless channel. The non-coherent energy detector uses interference to perform aggregation, and compares energy on two different sub-carriers to detect an aggregation value of all the users, so as to realize data recovery of the receiver network more efficiently.

Preferably, according to the present disclosure, in step (2), a defined learning objective is to minimize an empirical loss function, and the objective function is shown in Formula (I):

$$\min_{w \in \square^q} F(w) = \min_{w \in \square^q} \frac{1}{|D|} \sum_{\forall (x,y) \in D} f(w, x, y). \tag{I}$$

In Formula (I), F (w) represents a global average training loss, and the objective of the learning process is to minimize a global loss function; w is the federated learning system model parameter vector, $w=[w_l, \ldots, w_q]^T \in \square^q$, q is the number of vector parameters, $w_q$ is the single element of the federated learning system model parameter vector; f (w, x, y) is a sample loss function; and a framework of federated learning is configured to minimize F (w) in a distributed manner and obtain a local optimal point with full-batch gradient descent:

$$w^{(n+1)} = w^{(n)} - \delta g^{(n)} \tag{II}$$

In Formula (II), $\delta$ is a learning rate, $w^{(n)}$ is a federated learning system model parameter vector of the $n^{th}$ communication, and after the $k^{th}$ user receives the model parameter $w^{(n)}$ broadcast by the central server, each user node computes the corresponding local training loss and the corresponding gradient according to local data and the corresponding labels owned by the user node, and obtains a computed gradient $g^{(n)}$ shown in Formula (III):

$$g^{(n)} = \nabla F(w^{(n)}) = \frac{1}{|D|} \sum_{\forall (x,y) \in D} f(w, x, y). \tag{III}$$

In Formula (III), an $i^{th}$ element of the vector $g^{(n)}$ is the gradient of $F(w^{(n)})$ relative to $w_i^{(n)}$.

For n communication cycles, the $k^{th}$ user first computes a local stochastic gradient shown in Formula (IV):

$$\tilde{g}_k^{(n)} = \nabla F_k(w^{(n)}) = \frac{1}{n_k} \sum_{\forall (x_l, y_l) \in \tilde{D}_k} \nabla f(w^{(n)}, x_l, y_l). \tag{IV}$$

In Formula (IV), $\tilde{D}_k \in D_k$ is selected data batch from local data set , $n_k = |\tilde{D}_k|$ is used as the batch size for computing local gradient estimate, $F_k(w^{(n)})$ represents the local average training loss of the $k^{th}$ user, and $f(w^{(n)}, x_l, y_l)$ is the training loss of training data point $(x_l, y_l)$ in $k^{th}$ user node.

If the local gradient estimate is reliably transmitted to the edge server, the global estimate of the gradient of the loss function in Formula (I) is to be computed, as shown in Formula (V):

$$\tilde{g}^{(n)} = \frac{1}{K} \sum_{k=1}^{K} g_k^{(n)}. \tag{V}$$

The steps in (IV), (V), and (II) are then continuously iterated until the convergence condition is satisfied.

Preferably, according to the present disclosure, in step (3), the dynamic power control factor $Pr_k^{(n)}$ for resisting biased gradient aggregation is introduced, and the over-the-air computation communication model is shown in (VI):

$$y_c^{(n)} = \sum_{k=1}^{K} \sqrt{Pr_k^{(n)}} h_{k,c}^{(n)} t_{k,c}^{(n)} + n_{k,c}^{(n)}. \tag{VI}$$

In Formula (VI), $t_{k,c}^{(n)}$ is the sign transmitted at the $k^{th}$ user, $h_{k,c}^{(n)}$ is the channel coefficient between the edge server and the $k^{th}$ user, $h_{k,c}^{(n)} \square CN(0,1)$, $T_{k,c}^{(n)} \in \square$ is the transmitted sign from the $k^{th}$ user, $n_{k,c}^{(n)}$ is an additive white gaussian noise (AWGN) with a zero mean and variance $\sigma_n^2 c$ $\in \{0, 1, \ldots, R-1\}$, and the transmitted signal power of the $k^{th}$ user at the server is set as the introduced dynamic power control factor $Pr_k^{(n)}$.

Preferably, according to the present disclosure, in step (3), in the over-the-air computation communication model, the communication process includes the following specific implementation steps: at the transmitter, mapping $i \in \{1, 2, \ldots, q\}$ to different symbols during pre-processing, based on the value $\bar{g}_{k,i}^{(n)}$ in the $n^{th}$ communication cycle and transmitted symbols $t_{k,c^+}^{(n)}$ and $t_{k,c^-}^{(n)}$ at the $k^{th}$ user, $\forall i$ being shown in Formula (VII) and Formula (VIII):

$$t_{k,c^+}^{(n)} = \begin{cases} \sqrt{E_s} \times s_{k,i}^{(n)}, & \bar{g}_{k,i}^{(n)} = 1 \\ 0, & \bar{g}_{k,i}^{(n)} = -1 \end{cases}, \quad (VII)$$

$$t_{k,c^-}^{(n)} = \begin{cases} \sqrt{E_s} \times s_{k,i}^{(n)}, & \bar{g}_{k,i}^{(n)} = 1 \\ 0, & \bar{g}_{k,i}^{(n)} = -1 \end{cases}, \quad (VIII)$$

where $\sqrt{E_s}=1$ is a factor to normalize the OFDM symbol energy, and $s_{k,i}^{(n)}$ is a randomized sign on a unit circle;

introducing the dynamic power control factor $Pr_k^{(n)}$ for resisting biased gradient aggregation, superimposed symbols $y_{c^+}^{(n)}$ and $y_{c^-}^{(n)}$ of given i at the receiver by setting the power configuration of each user being shown in Formula (IX) and Formula (X):

$$y_{c^+}^{(n)} = \sqrt{E_s} \sum_{\bar{g}_{k,i}^{(n)}=1} \sqrt{Pr_k^{(n)}} h_{k,c^+}^{(n)} t_{k,c^+}^{(n)} + n_{k,c^+}^{(n)}, \quad (IX)$$

$$y_{c^-}^{(n)} = \sqrt{E_s} \sum_{\bar{g}_{k,i}^{(n)}=1} \sqrt{Pr_k^{(n)}} h_{k,c^-}^{(n)} t_{k,c^-}^{(n)} + n_{k,c^-}^{(n)}. \quad (X)$$

In Formulas (IX) and (X), $h_{k,c^+}^{(n)}$ and $h_{k,c^-}^{(n)}$ are channel coefficients corresponding to two sub-carriers, and $n_{k,c^+}^{(n)}$ and $n_{k,c^-}^{(n)}$ are corresponding channel noises respectively.

Further preferably, the dynamic power control factor $Pr_m^{(n)}$ for resisting biased gradient aggregation is shown in Formula (XII):

$$Pr_k^{(n)} = Pr_k^{(n-1)} + \left| \frac{1}{q} \sum_{i=1}^{q} \left[ 1_{\bar{g}_{k,i}^{(n)}=\hat{v}_i^{(n)}} - 1_{\bar{g}_{k,i}^{(n)} \neq \hat{v}_i^{(n)}} \right] \right|, \quad (XI)$$

where $v_i^{(n)}$ and $\bar{g}_{k,i}^{(n)}$ are $i^{th}$ parameters of model parameter aggregation result $\hat{v}^{(n)}$ indicating that weights are equal at aggregation pre-processing and the vector $\bar{g}_k^{(n)}$ shared by $k^{th}$ user, respectively.

Preferably, according to the present disclosure, in step (4), the edge server obtains the aggregation value $v_i^{(n)}$ of the $i^{th}$ gradient sign shown in Formula (XII):

$$v_i^{(n)} \square \text{sign}(\Delta_i^{(n)}) \quad (XII)$$

In Formula (XII), $\Delta_i^{(n)} \square e_i^+ - e_i^-$, $e_i^{+\square|y_{c^+}^{(n)}|_2^2}$, $e_i^- \square |y_{c^-}^{(n)}|_x^2$, $\forall i$, and $\hat{v}_1^{(n)} = [\hat{v}_1^{(n)}, \hat{v}_2^{(n)}, \ldots, \hat{v}_q^{(n)}]^T$ is the aggregation value vector for each user recovered at the receiver.

Preferably, according to the present disclosure, in step (5), after being received, the aggregation value of gradient signs of federated learning training is transmitted back to each user, and each user uses the aggregation value to update a current federated learning system model via gradient descent based on the following equation, namely Formula (XIVI):

$$w^{(n+1)} = w^{(n)} - \delta v^{(n)} \quad (XIII).$$

Formula (XIII) is continuously repeated until a predetermined convergence criterion is reached.

A computer device includes a memory and a processor. The memory stores a computer program. The processor, when executing the computer program, implements the steps of the dynamic power control method for resisting multi-user parameter biased aggregation in federated learning.

A computer-readable storage medium has stored thereon a computer program. The computer program, when executed by a processor, implements the steps of the dynamic power control method for resisting multi-user parameter biased aggregation in federated learning.

A dynamic power control system for resisting multi-user parameter biased aggregation in federated learning includes:

a federated learning system model establishment module, configured to establish a federated learning system model for resisting parameter biased aggregation;

an objective function construction module, configured to construct a corresponding objective function based on a training purpose of the federated learning system model;

an over-the-air computation communication model determination module, configured to introduce, according to the established federated learning system model, a power control factor for resisting user biased gradient aggregation, and determine a corresponding over- the-air computation communication model;

a signal processing module, configured to process the signal by the receivers using the non-coherent energy detection method without cooperation between the receivers and the transmitters; and a dynamic power control module, configured to determine a federated learning security mechanism method based on resistance against parameter biased aggregation, and complete an updating training process of the federated learning system model.

Beneficial Effects of the Present Disclosure:

For gradient biased aggregation condition of participating users in federated learning training, user's privacy requirements and communication burden requirements for relieving large-scale parameter transmission are comprehensively considered, and a safe-efficient balance is achieved. A corresponding dynamic power control scheme is constructed by balancing global parameters of users and servers. Further, in view of the problems encountered in an efficient over-the-air computation communication way, a more efficient communication aggregation way is selected. In order to make convergence directions between the local model and the global optimal model consistent and better ensure the performance of the global model, the present disclosure uses a more reasonable dynamic power control factor to train a federated learning network to better converge with the global model, and considers the rationality of the global model so as to resist users with the larger deviation parameter dominating the federated learning training process.

DETAILED DESCRIPTION OF THE EMBODIMENTS

The present disclosure is further defined, but not limited, by reference to the accompanying drawings and examples.

Example 1

Figure 1:
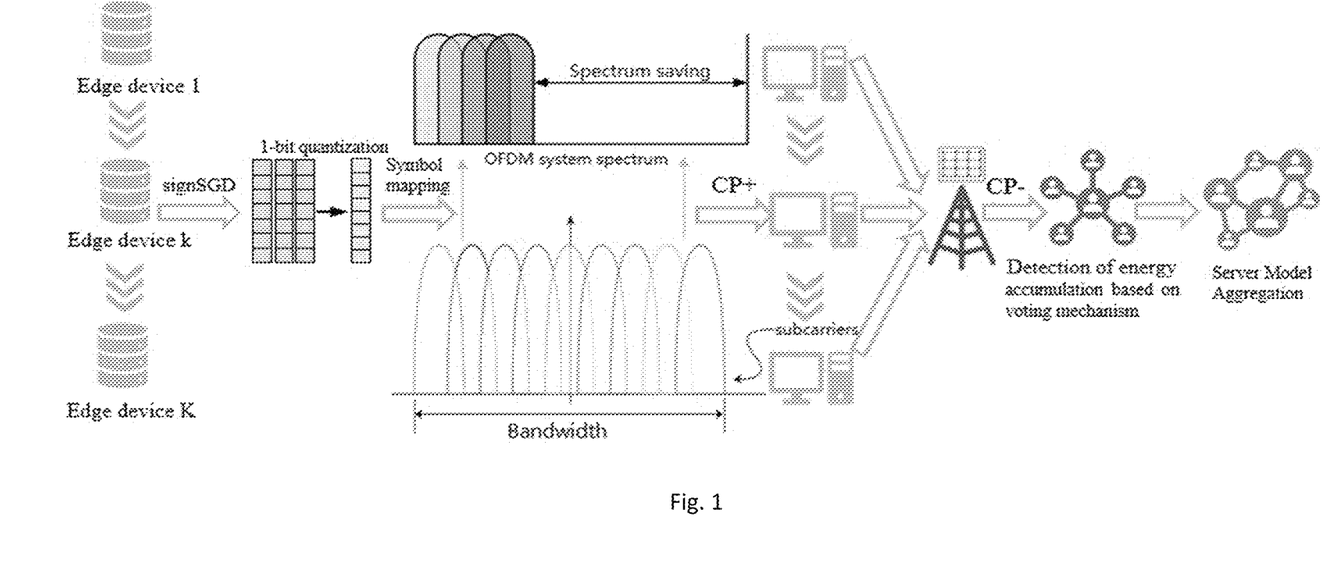
FIG. 1 is a flowchart of a dynamic power control method for resisting multi-user parameter biased aggregation in federated learning according to the present disclosure.

As shown in FIG. 1, a dynamic power control method for resisting multi-user parameter biased aggregation in federated learning includes the following specific implementation steps.
(1) A federated learning system model for resisting parameter biased aggregation is established, and an overall workflow is determined.
(2) A corresponding objective function is constructed based on a training purpose of the federated learning system model.
(3) According to the federated learning system model established in step (1), a power control factor for resisting user biased gradient aggregation is introduced, and a corresponding over-the-air computation communication model is determined.
(4) A signal is processed by a receiver using an incoherent energy detection method without cooperation between the receiver and a transmitter.
(5) According to the method in step (4), a federated learning security mechanism method based on resistance against parameter biased aggregation is determined, and an updating training process of the federated learning system model is completed. The impact on gradient sign aggregation is reduced while reducing communication overheads.

The dynamic power control method is applied to a federated learning security mechanism system. As shown in FIG. 1, the federated learning security mechanism system includes K users, an edge server, S OFDM symbols s, and R active sub-carriers.

Each user is connected to a central server.

Training data of all the users are set to be multi-label data from the same feature space, and the total number of labels is L.

Each local data point of any user has the same type of label, local data of a marked data sample on the $k^{th}$ user is represented by $D_k$, $(x_l, y_l) \in D_k$, $x_l$ and $y_l$ represent the data sample and the corresponding label, respectively, and the sum of the local data of all the users is D, satisfying: $\Sigma_{k=1}^{K} D_k = D$.

The present disclosure provides a dynamic power control method for resisting multi-user parameter biased aggregation in federated learning by fully considering the scarcity of communication resources caused by transmission of federated learning parameters and the problem caused by channel state information in over-the-air computation.

Example 2

The difference from the dynamic power control method for resisting multi-user parameter biased aggregation in federated learning according to Example 1 is as follows.

Figure 2:
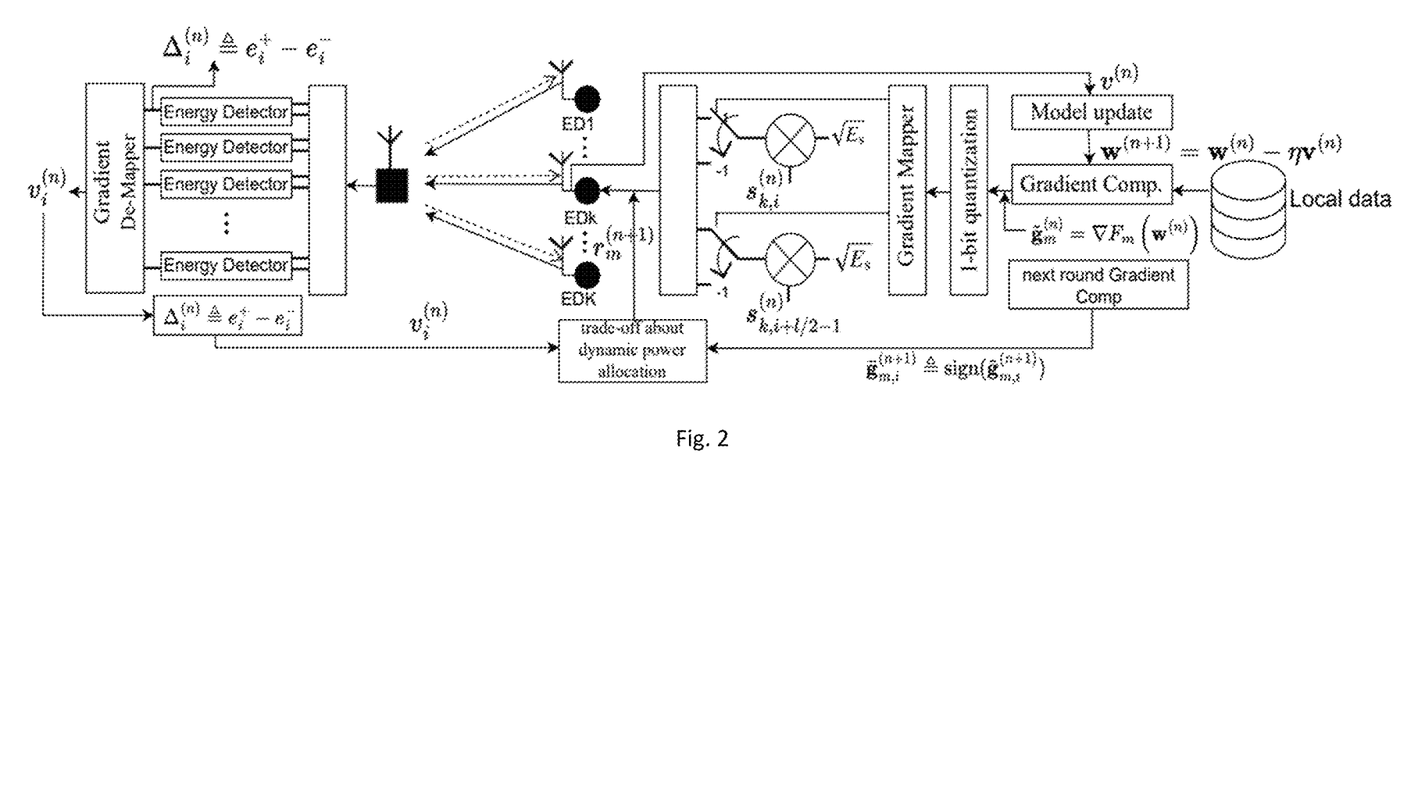
FIG. 2 is a schematic diagram of a federated learning system model based on dynamic power control.

In step (1), the federated learning system model for resisting parameter biased aggregation includes a transmitter network, a wireless channel, and a receiver network, as shown in FIG. 2.

The transmitter network includes one-bit quantization, local user parameter updating portion, and user dynamic power control block. The receiver network includes non-coherent energy detector. The one-bit quantization simplifies the sign of local gradient parameters. The training of the federated learning system model can be accelerated, and the energy consumption of devices can be reduced. The local user parameter updating portion is configured to realize the local updating training process of the federated learning system model. The user dynamic power control block dynamically controls the transmitted power according to the degree of each user's contribution to the convergence of the federated learning system model, so as to offset the deviation of parameter aggregation in the wireless channel. The non-coherent energy detector uses interference to perform aggregation without the aid of channel state information, and compares energy on two different sub-carriers to detect an aggregation value of all the users, so as to realize data recovery of the receiver network more efficiently.

In a dynamic power control portion, the present disclosure considers that a result-oriented feedback aggregation gradient and a gradient of each user are correspondingly balanced to determine the value of the power control factor of each user. In the wireless channel portion, it is considered that training for federated learning is accomplished by using an over-the-air computation method based on non-coherent detection, without using channel state information at the users and the server. Inspired by sign stochastic gradient descent in the form of majority vote, orthogonal resources, namely OFDM symbols, are used to transmit signs of local stochastic gradient. The aggregation of the signs of local stochastic gradient is then obtained at the server by the energy detector.

In step (2), a defined learning objective is to minimize an empirical loss function, and the objective function is shown in Formula (I):

$$\min_{w \in \Box^q} F(w) = \min_{w \in \Box^q} \frac{1}{|D|} \sum_{\forall (x,y) \in D} f(w, x, y). \tag{I}$$

In Formula (I), F(w) represents a global average training loss, and the objective of the learning process is to minimize a global loss function. w is the federated learning system model parameter vector, and $w = [w_1, \ldots, w_q]^T \in \Box^q$. q is the number of vector parameters. $w_q$ is the single element of the federated learning system model parameter vector. f(w, x, y) is a sample loss function. A method for achieving a learning objective is to upload all local data sets to an edge server and solve the problem in a centralized manner. However, this is generally not possible because of privacy problems or the absolute size of the data set. A framework of federated learning is configured to minimize F(w) in a distributed manner and obtain a local optimal point with full-batch gradient descent:

$$w^{(n+1)} = w^{(n)} - \delta g^{(n)} \tag{II}$$

In Formula (II), $\delta$ is a learning rate, $w^{(n)}$ is a federated learning system model parameter vector of the $n^{th}$ communication, and after the $k^{th}$ user receives the model parameter $w^{(n)}$ broadcast by the central server, each user node computes the corresponding local training loss and the corresponding gradient according to local data and the corresponding labels owned by the user node, and obtains a computed gradient $g^{(n)}$ shown in Formula (III):

$$g^{(n)} = \nabla F(w^{(n)}) = \frac{1}{|D|} \sum_{\forall (x,y) \in D} f(w, x, y). \tag{III}$$

In Formula (III), an $i^{th}$ element of the vector $g^{(n)}$ is the gradient of $F(w^{(n)})$ relative to $w_i^{(n)}$.

In the method used by the present disclosure, for n communication cycles, the $k^{th}$ user first computes a local stochastic gradient shown in Formula (IV):

$$\tilde{g}_k^{(n)} = \nabla F_k(w^{(n)}) = \frac{1}{n_k} \sum_{\forall (x_l, y_l) \in \tilde{D}_k} \nabla f(w^{(n)}, x_l, y_l). \tag{IV}$$

In Formula (IV), $\tilde{D}_k \in D_k$ is selected data batch from local data set, $n_k = |\tilde{D}_k|$ is used as the batch size for computing local gradient estimate, $F_k(w^{(n)})$ represents the local average training loss of the $k^{th}$ user, and $f(w^{(n)}, x_l, y_l)$ is the training loss of training data point $(x_l, y_l)$ in the $k^{th}$ user node.

If the local gradient estimate is reliably transmitted to the edge server, the global estimate of the gradient of the loss function in Formula (I) is to be computed, as shown in Formula (V):

$$\tilde{g}^{(n)} = \frac{1}{K} \sum_{k=1}^{K} \tilde{g}_k^{(n)}. \tag{V}$$

The steps in (IV), (V), and (II) are then continuously iterated until the convergence condition is satisfied. It can be observed from Formula (V) that it is simply the process of aggregating gradients, rather than individual gradient estimates $\tilde{g}_k^{(n)}$ required to compute the global gradient estimate at the edge server. This also lays the foundation for the subsequently presented efficient communication aggregation scheme.

In step (3), for the over-the-air computation communication model used in the present disclosure, in order to eliminate the delay caused by orthogonal multiple access and enable distributed training in a mobile wireless network, the aggregation of signs is detected in a fading channel by using a simple but efficient over-the-air computation scheme. Parameters are transmitted in the federated learning process by using an over-the-air computation method based on non-coherent detection without using channel state information at the edge server and the users. The users access the wireless channel on the same time frequency resource at the same time as OFDM symbols composed of active sub-carriers. Assuming that the duration of a cyclic prefix (CP) is greater than a maximum delay of a channel between the edge server and the users, and considering the independent frequency selection channel between the edge server and the users for the $n^{th}$ communication cycle of federated edge learning at the edge server, transmitted superimposed symbols $y_c^{(n)}$ are as follows:

$$y_c^{(n)} = \sum_{k=1}^{K} \sqrt{P_k} \, h_{k,c}^{(n)} t_{k,c}^{(n)} + n_{k,c}^{(n)}.$$

In view of providing users with a larger proportion of biased gradient signs and users with a larger AWGN, the dynamic power control factor $Pr_k^{(n)}$ for resisting biased gradient aggregation is introduced in the present disclosure, and the over-the-air computation communication model is shown in (VI):

$$y_c^{(n)} = \sum_{k=1}^{K} \sqrt{Pr_k^{(n)}} \, h_{k,c}^{(n)} t_{k,c}^{(n)} + n_{k,c}^{(n)}. \tag{VI}$$

In Formula (VI), $t_{k,c}^{(n)}$ is the sign transmitted at the $k^{th}$ user, $h_{k,c}^{(n)}$ is the channel coefficient between the edge server and the $k_{th}$ user, $h_{k,c}^{(n)} \square CN(0,1)$, $t_{k,c}^{(n)} \in \square$ is the transmitted sign from the $k^{th}$ user, $n_{k,c}^{(n)}$ is an AWGN with a zero mean and variance $\sigma_n^2$, $c \in \{0,1, \ldots, R-1\}$, and the transmitted signal power of the $k^{th}$ user at a server is set as the introduced dynamic power control factor $Pr_k^{(n)}$.

In step (3), in the over-the-air computation communication model, the communication process includes the following specific implementation steps.

Based on the over-the-air computation method used, considering the operation between the receivers and the transmitters, each user performs a low complexity operation to convey the signs of local stochastic gradient given in Formula (IV) by actually transmitting the signs of local stochastic gradient instead of an actual value of the local gradient, expressed as $\bar{g}_k^{(n)}$, where the $i^{th}$ element of the vector $\bar{g}_k^{(n)}$ is $\bar{g}_{k,i}^{(n)} \square \text{sign}(\tilde{g}_{k,i}^{(n)})$ (1-bit quantization process).

$i \in \{1,2, \ldots, q\}$ is mapped to different signs at the transmitter during pre-processing. Based on the value $\bar{g}_{k,i}^{(n)}$ in the $n^{th}$ communication cycle and transmitted symbols $t_{k,c^+}^{(n)}$ and $t_{k,c^-}^{(n)}$ at the $k^{th}$ user, $\forall i$ is shown in Formula (VII) and Formula (VIII):

$$t_{k,c^+}^{(n)} = \begin{cases} \sqrt{E_s} \times s_{k,i}^{(n)}, & \bar{g}_{k,i}^{(n)} = 1 \\ 0, & \bar{g}_{k,i}^{(n)} = -1 \end{cases}, \tag{VII}$$

$$t_{k,c^-}^{(n)} = \begin{cases} \sqrt{E_s} \times s_{k,i}^{(n)}, & \bar{g}_{k,i}^{(n)} = 1 \\ 0, & \bar{g}_{k,i}^{(n)} = -1 \end{cases}, \tag{VIII}$$

where $\sqrt{E_s} = 1$ is a factor to normalize the OFDM symbol energy, and $s_{k,i}^{(n)}$ is a randomized sign on a unit circle. Therefore, in order to indicate the signs of local stochastic gradient, two sub-carriers are dedicated to (VII) and (VIII). Furthermore, truncated channel inversion is not used to compensate for the impact of the multipath channel on the transmitted symbols, since the objective is to use energy accumulation on two different sub-carriers to detect the aggregation of gradient signs with the non-coherent detector, namely, the concept of majority vote. The method used in the present disclosure is a special case of frequency shift keying (FSK) on the OFDM sub-carriers. In this case, the vote of the $k^{th}$ user for the $i^{th}$ gradient is independent of the selection thereof. Since adjacent sub-carriers experience similar channel conditions, namely $h_{k,c^+}^{(n)} = h_{k,c^++1}^{(n)}$, $t_{k,c^+}^{(n)}$ $t_{k,c^-}^{(n)}$ are computed for all i and k, each user transmits based on the over-the-air computation method.

By using a mapping function, superimposed symbols $y_{c^+}^{(n)}$ and $y_{c^-}^{(n)}$ of given i at the receiver are as follows:

$$y_{c^+}^{(n)} = \sqrt{E_s} \sum_{g_{k,i}^{(n)}=1} \sqrt{P_k} h_{k,c^+}^{(n)} t_{k,c^+}^{(n)} + n_{k,c^+}^{(n)},$$

$$y_{c^-}^{(n)} = \sqrt{E_s} \sum_{g_{k,i}^{(n)}=1} \sqrt{P_k} h_{k,c^-}^{(n)} t_{k,c^-}^{(n)} + n_{k,c^-}^{(n)}.$$

At this point, the power configuration is not performed, and the transmitted power is set to the same constant value.

In the present disclosure, the dynamic power control factor $Pr_k^{(n)}$ for resisting biased gradient aggregation is introduced, and superimposed symbols $y_{c^+}^{(n)}$ and $y_{c^-}^{(n)}$ of given z at the receiver by setting the power configuration of each user are shown in Formula (IX) and Formula (X):

$$y_{c^+}^{(n)} = \sqrt{E_s} \sum_{g_{k,i}^{(n)}=1} \sqrt{Pr_k^{(n)}} h_{k,c^+}^{(n)} t_{k,c^+}^{(n)} + n_{k,c^+}^{(n)}, \quad (IX)$$

$$y_{c^-}^{(n)} = \sqrt{E_s} \sum_{g_{k,i}^{(n)}=1} \sqrt{Pr_k^{(n)}} h_{k,c^-}^{(n)} t_{k,c^-}^{(n)} + n_{k,c^-}^{(n)}. \quad (X)$$

In Formulas (IX) and (X), $h_{k,c^+}^{(n)}$ and $h_{k,c^-}^{(n)}$ are channel coefficients corresponding to two sub-carriers, and $n_{k,c^+}^{(n)}$ and $n_{k,c^-}^{(n)}$ are corresponding channel noises respectively.

The dynamic power control factor $Pr_m^{(n)}$ for resisting biased gradient aggregation is shown in Formula (XII):

$$Pr_k^{(n)} = Pr_k^{(n-1)} + \left| \frac{1}{q} \sum_{i=1}^{q} \left[ 1_{\bar{g}_{k,i}^{(n)} = \hat{v}_i^{(n)}} - 1_{\bar{g}_{k,i}^{(n)} \neq \hat{v}_i^{(n)}} \right] \right|, \quad (XI)$$

where $v_i^{(n)}$ and $\bar{g}_{k,i}^{(n)}$ are $i^{th}$ parameters of model parameter aggregation result $\hat{v}^{(n)}$ indicating that weights are equal at aggregation pre-processing and the vector $\bar{g}_k^{(n)}$ shared by $k^{th}$ user, respectively. Adding $Pr_k^{(n-1)}$ is the result of a previous round of balance giving better experience for a next round of iteration. Considering that the training direction of the global model is guaranteed to be error-free, a sign value of each user is balanced with an aggregation result indicating that weights are equal, so as to obtain the corresponding dynamic power control factor.

In step (4), the edge server obtains the aggregation value $v_i^{(n)}$ of the $i^{th}$ gradient sign shown in Formula (XII):

$$v_i^{(n)} \square \text{sign}(\Delta_i^{(n)}) \quad (XII).$$

In Formula (XII), $\Delta_i^{(n)} \square e_i^+ - e_i^-$, $e_i^+ \square |y_{c^+}^{(n)}|_2^2 e_i^- \square |y_{c^-}^{(n)}|_2^2$, $\forall i$, and $\hat{v}^{(n)} = [\hat{v}_1^{(n)}, \hat{v}_2^{(n)}, \ldots, \hat{v}_q^{(n)}]^T$ is the aggregation value vector for each user recovered at the receiver. At this point, the contribution of each user to the model convergence is dynamically regulated by the transmitted power. Since cooperation is not considered between the receivers and the transmitters, no separate demodulation is performed. Therefore, the aggregation value in Formula (XII) is obtained by using a simple and efficient energy detection method at the receiver. The practice is to aggregate with interference and compare energy on two different sub-carriers to detect the aggregation of signs in (VI).

In step (5), after being received, the aggregation value of gradient signs of federated learning training is transmitted back to each user, and each user uses the aggregation value to update a current federated learning model via gradient descent based on the following equation, namely Formula (XIVI):

$$w^{(n+1)} = w^{(n)} - \delta v^{(n)} \quad (XIII).$$

Formula (XIII) is continuously repeated until a predetermined convergence criterion is reached. Since the direction of the gradient is used for model updating in the present disclosure, the overheads of communication resources are greatly reduced.

This example verifies the effectiveness of the invention with a Mnist data set and compares the proposed algorithm in experiments with two baseline algorithms: SIGNSGD and FedAvg, which are both in scenarios of channel noiseless aggregation, and a group of identical algorithms compared to an equal power configuration are added.

Figure 3:
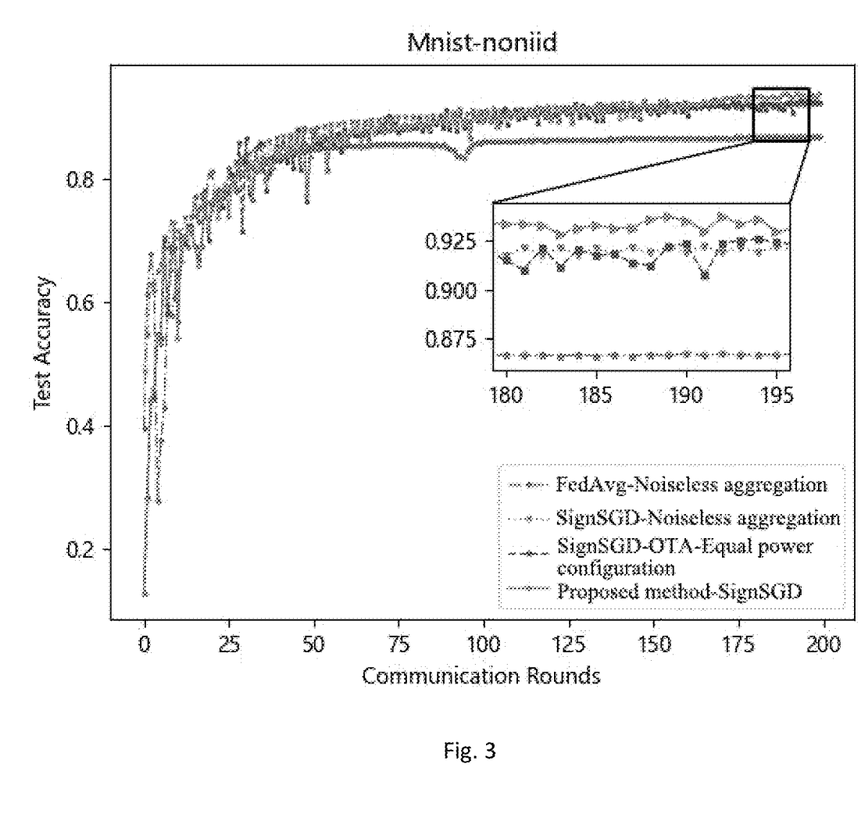
FIG. 3 is a schematic diagram of accuracy of model testing against comparative schemes under non-independent identically distributed data according to the present disclosure.
Figure 4:
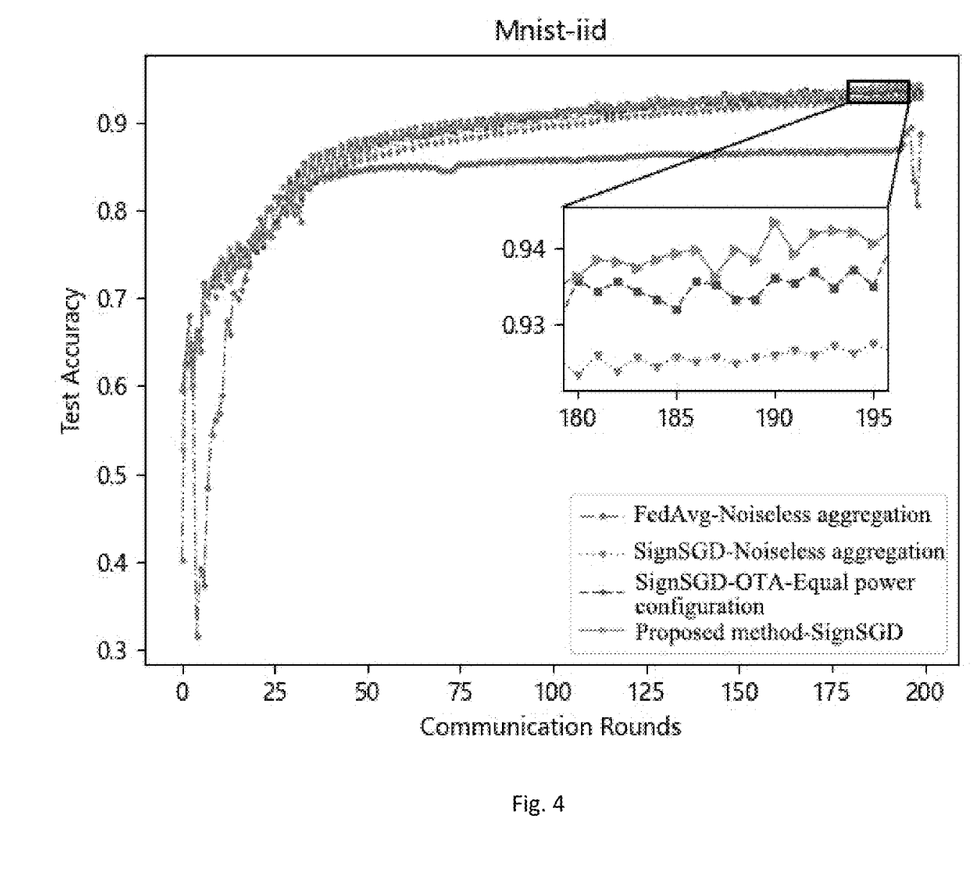
FIG. 4 is a schematic diagram of accuracy of model testing against comparative schemes under independent identically distributed data according to the present disclosure.

As shown in non-independent identically distributed data of FIG. 3 and independent identically distributed data of FIG. 4, an accuracy test of the algorithm mentioned in the present disclosure is superior to the two baseline algorithms on a test set, and the convergence speed is higher, which indicates that the dynamic power control method used in the present disclosure can effectively solve the biased interference of channel fading and noise on global parameter aggregation in the channel transmission, and ensure that the federated learning model can finally achieve better effects.

Figure 5:
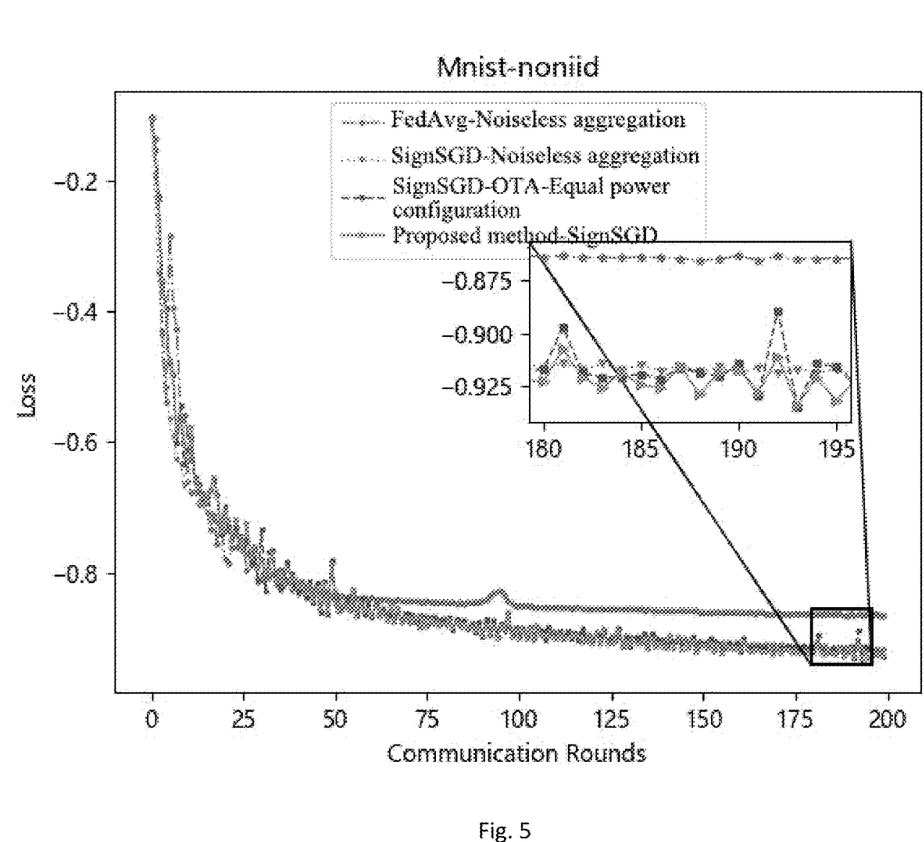
FIG. 5 is a schematic diagram of a model training loss function against comparative schemes under non-independent identically distributed data according to the present disclosure.
Figure 6:
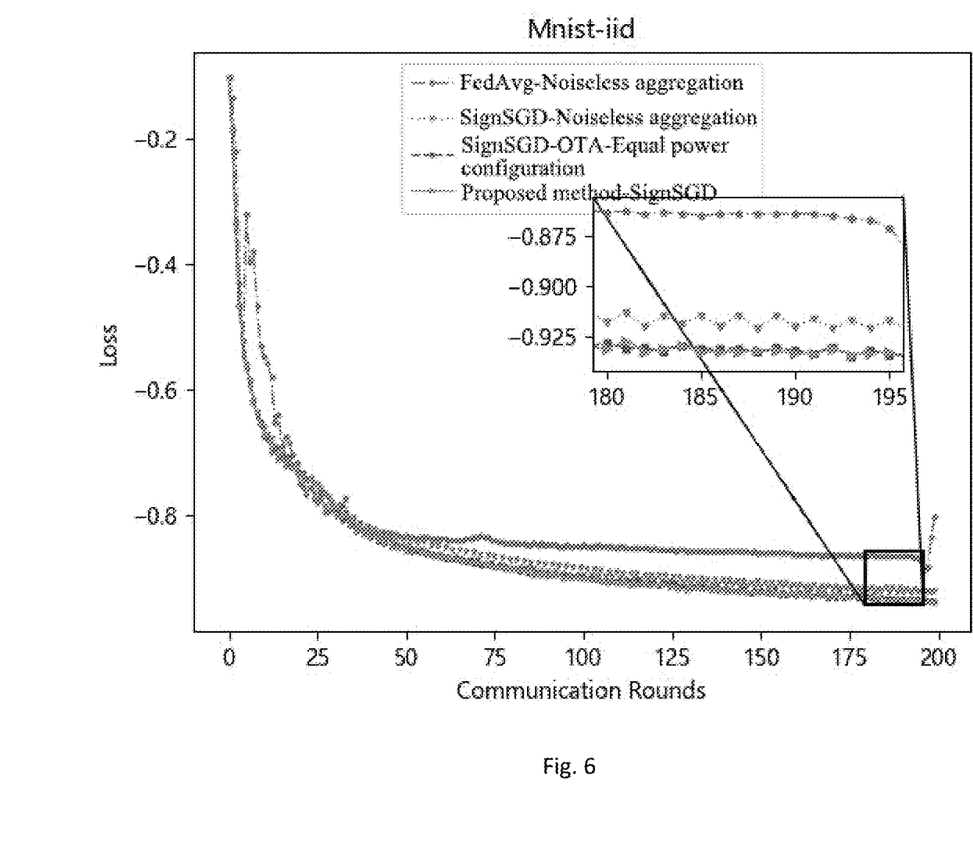
FIG. 6 is a schematic diagram of a model training loss function against comparative schemes under independent identically distributed data according to the present disclosure.

FIG. 5 is a schematic diagram of a model training loss function against comparative schemes under non-independent identically distributed data according to the present disclosure. FIG. 6 is a schematic diagram of a model training loss function against comparative schemes under independent identically distributed data according to the present disclosure. Compared with comparative schemes, the scheme proposed in the present disclosure achieves a smaller loss function tending to converge as the number of communication iterations increases. It can be seen from FIG. 5 and FIG. 6 that the scheme proposed in the present disclosure maintains the same convergence trend in two environments of data heterogeneity, thus further demonstrating the effect of the present disclosure.

Example 3

A computer device includes a memory and a processor. The memory stores a computer program. The processor, when executing the computer program, implements the steps of the dynamic power control method for resisting multi-user parameter biased aggregation in federated learning in Example 1 or 2.

Example 4

A computer-readable storage medium has stored thereon a computer program. The computer program, when executed by a processor, implements the steps of the dynamic power control method for resisting multi-user parameter biased aggregation in federated learning in Example 1 or 2.

Example 5

A dynamic power control system for resisting multi-user parameter biased aggregation in federated learning includes:

a federated learning system model establishment module, configured to establish a federated learning system model for resisting parameter biased aggregation;

an objective function construction module, configured to construct a corresponding objective function based on a training purpose of the federated learning system model;

an over-the-air computation communication model determination module, configured to introduce, according to the established federated learning system model, a power control factor for resisting user biased gradient aggregation, and determine a corresponding over- the-air computation communication model;

a signal processing module, configured to process the signal by the receivers using the non-coherent energy detection method without cooperation between the receivers and the transmitters; and a dynamic power control module, configured to determine a federated learning security mechanism method based on resistance against parameter biased aggregation, and complete an updating training process of the federated learning system model.

What is claimed is:

1. A dynamic power control method for resisting multi-user parameter biased aggregation in federated learning, comprising the following specific implementation steps:

(1) establishing a federated learning system model for resisting parameter biased aggregation;

(2) constructing a corresponding objective function based on a training purpose of the federated learning system model;

(3) introducing, according to the federated learning system model established in step (1), a power control factor for resisting user biased gradient aggregation, and determining a corresponding over-the-air computation communication model;

(4) processing the signal by the receivers using the non-coherent energy detection method without cooperation between the receivers and a transmitters; and (5) determining, according to the method in step (4), a federated learning security mechanism method based on resistance against parameter biased aggregation, and completing an updating training process of the federated learning system model, wherein in step (3), the dynamic power control factor $Pr_k^{(n)}$ for resisting biased gradient aggregation is introduced, and the over-the-air computation communication model is shown in (VI):

$$y_c^{(n)} = \sum_{k=1}^{K} \sqrt{Pr_k^{(n)}} h_{k,c}^{(n)} t_{k,c}^{(n)} + n_{k,c}^{(n)}, \quad (VI)$$

in Formula (VI), $t_{k,c}^{(n)}$ is the sign transmitted at the $k^{th}$ user, $h_{k,c}^{(n)}$ is the channel coefficient between the edge server and the $k^{th}$ user, $h_{k,c}^{(n)} \square CN(0,1)$, $t_{k,c}^{(n)} \in \square$ is the transmitted sign from the $k^{th}$ user, $n_{k,c}^{(n)}$ is an additive white gaussian noise (AWGN) with a zero mean and variance $\sigma_n^2$, $c \in \{0,1,\ldots,R-1\}$, and the transmitted signal power of the $k^{th}$ user at the server is set as the introduced dynamic power control factor $Pr_k^{(n)}$;

in the over-the-air computation communication model, the communication process comprises the following specific implementation steps:

at the transmitter, mapping $i \in \{1,2,\ldots,q\}$ to different symbols during pre-processing, q being the number of vector parameters, based on the value $\bar{g}_{k,i}^{(n)}$ in the $n^{th}$ communication cycle and transmitted symbols $t_{k,c^+}^{(n)}$ and $t_{k,c^-}^{(n)}$ at the $k^{th}$ user, $\forall i$ being shown in Formula (VII) and Formula (VIII):

$$t_{k,c^+}^{(n)} = \begin{cases} \sqrt{E_s} \times s_{k,i}^{(n)}, & \bar{g}_{k,i}^{(n)} = 1 \\ 0, & \bar{g}_{k,i}^{(n)} = -1 \end{cases}, \quad (VII)$$

$$t_{k,c^-}^{(n)} = \begin{cases} \sqrt{E_s} \times s_{k,i}^{(n)}, & \bar{g}_{k,i}^{(n)} = 1 \\ 0, & \bar{g}_{k,i}^{(n)} = -1 \end{cases} \quad (VIII)$$

wherein $\sqrt{E_s}=1$ is a factor to normalize the OFDM symbol energy, and $s_{k,i}^{(n)}$ is a randomized sign on a unit circle;

introducing the dynamic power control factor $Pr_k^{(n)}$ for resisting biased gradient aggregation, superimposed signs $y_{c^+}^{(n)}$ and $y_{c^-}^{(n)}$ of given i at the receiver by setting the power configuration of each user being shown in Formula (IX) and Formula (X):

$$y_{c^+}^{(n)} = \sqrt{E_s} \sum_{\bar{g}_{k,i}^{(n)}=1} \sqrt{Pr_k^{(n)}} h_{k,c^+}^{(n)} t_{k,c^+}^{(n)} + n_{k,c^+}^{(n)}, \quad (IX)$$

$$y_{c^-}^{(n)} = \sqrt{E_s} \sum_{\bar{g}_{k,i}^{(n)}=1} \sqrt{Pr_k^{(n)}} h_{k,c^-}^{(n)} t_{k,c^-}^{(n)} + n_{k,c^-}^{(n)} \quad (X)$$

wherein in Formulas (IX) and (X), $h_{k,c^+}^{(n)}$ and $h_{k,c^-}^{(n)}$ are channel coefficients corresponding to two sub-carriers, and $n_{k,c^+}^{(n)}$ and $n_{k,c^-}^{(n)}$ are corresponding channel noises respectively;

the dynamic power control method is applied to a federated learning security mechanism system, the federated learning security mechanism system comprising K users, an edge server, S orthogonal frequency division multiplexing (OFDM) symbols, and R active sub-carriers;

each user is connected to a central server;

training data of all the users are set to be multi-label data from the same feature space, the total number of labels being L;

each local data point of any user has the same type of label, local data of a marked data sample on the $k^{th}$ user is represented by $D_k$, $(x_l, y_l) \in D_k$, $x_l$ and $y_l$ represent the data sample and the corresponding label, respectively, and the sum of the local data of all the users is D, satisfying: $\Sigma_{k=1}^{K} D_k = D$.

2. The dynamic power control method for resisting multi-user parameter biased aggregation in federated learning according to claim 1, wherein in step (1), the federated learning system model for resisting parameter biased aggregation comprises a transmitter network, a wireless channel, and a receiver network, the transmitter network comprises one-bit quantization, local user parameter updating portion, and user dynamic power control block, and the receiver network comprises an non-coherent energy detector;

the one-bit quantization simplifies the sign of local gradient parameters, the local user parameter updating portion is configured to realize a local updating training process of the federated learning system model, the user dynamic power control block dynamically controls the transmitted power according to the degree of contribution of each user to the convergence of the federated learning system model, so as to offset the deviation of parameter aggregation in the wireless channel, and the non-coherent energy detector uses interference to perform aggregation, and compares energy on two different sub-carriers to detect an aggregation value of all the users, so as to realize data recovery of the receiver network more efficiently.

3. The dynamic power control method for resisting multi-user parameter biased aggregation in federated learning according to claim 1, wherein in step (2), a defined learning objective is to minimize an empirical loss function, and the objective function is shown in Formula (I):

$$\min_{w \in \|^q} F(w) = \min_{w \in ^q} \frac{1}{|D|} \sum_{\forall (x,y) \in D} f(w, x, y), \quad (I)$$

in Formula (I), F(w) represents a global average training loss, and the objective of the learning process is to minimize a global loss function; w is the federated learning system model parameter vector, $w=[w_1, \ldots, w_q]^T \in \square^1$ q is the number of vector parameters, $w_q$ is the single element of the federated learning system model parameter vector; f (w, x, y) is a sample loss function; and a framework of federated learning is configured to minimize F(w) in a distributed manner and obtain a local optimal point with full-batch gradient descent:

$$w^{(n+1)} = w^{(n)} - \delta g^{(n)} \quad (II),$$

W =W in Formula (II), δ is the learning rate, $w^{(n)}$ is a federated learning system model parameter vector of the $n^{th}$ communication, and after the $k^{th}$ user receives the model parameter $w^{(n)}$ broadcast by the central server, each user node computes a corresponding local training loss and a corresponding gradient according to local data and the corresponding labels owned by the user node, and obtains a computed gradient $g^{(n)}$ shown in Formula (III):

$$g^{(n)} = \nabla F(w^{(n)}) = \frac{1}{|D|} \sum_{\forall (x,y) \in D} f(w, x, y), \quad (III)$$

in Formula (III), an $i^{th}$ element of the vector $g^{(n)}$ is the gradient of $F(w^{(n)})$ relative to $w_i^{(n)}$;

for n communication cycles, the $k^{th}$ user first computes a local stochastic gradient shown in Formula (IV):

$$\tilde{g}_k^{(n)} = \nabla F_k(w^{(n)}) = \frac{1}{n_k} \sum_{\forall (x_l, y_l) \in \tilde{D}_k} \nabla f(w^{(n)}, x_l, y_l), \quad (IV)$$

in Formula (IV), $\tilde{D}_k \in D_k$ is selected data batch from local data set r, $n_k = |\tilde{D}_k|$ is used as the batch size for computing a local gradient estimate, $F_k(w^{(n)})$ represents the local average training loss of the $k^{th}$ user, and $f(w^{(n)}, w_l, y_l)$ is the training loss of the training data point $(x_l, y_l)$ in the $k^{th}$ user node;

if the local gradient estimate is reliably transmitted to the edge server, the global estimate of the gradient of the loss function in Formula (I) is to be computed, as shown in Formula (V):

$$\tilde{g}^{(n)} = \frac{1}{K} \sum_{k=1}^{K} \tilde{g}_k^{(n)}, \quad (V)$$

the steps in (IV), (V), and (II) are then continuously iterated until the convergence condition is satisfied.

4. The dynamic power control method for resisting multi-user parameter biased aggregation in federated learning according to claim 3, wherein the dynamic power control factor $Pr_k^{(n)}$ for resisting biased gradient aggregation is shown in Formula (XI):

$$Pr_k^{(n)} = Pr_k^{(n-1)} + \left| \frac{1}{q} \sum_{i=1}^{q} \left[ 1_{g_{k,i}^{(n)} = \hat{v}_i^{(n)}} - 1_{g_{k,i}^{(n)} \neq \hat{v}_i^{(n)}} \right] \right|, \quad (XI)$$

wherein $\hat{v}_i^{(n)}$ and $\bar{g}_{k,i}^{(n)}$ are $i^{th}$ parameters of model parameter aggregation result $\hat{v}^{(n)}$ indicating that weights are equal at aggregation pre-processing and the vector $\bar{g}_k^{(n)}$ shared by $k^{th}$ user, respectively.

5. The dynamic power control method for resisting multi-user parameter biased aggregation in federated learning according to claim 1, wherein in step (4), the edge server obtains the aggregation value v, $v_i^{(n)}$ of the $i^{th}$ gradient sign shown in Formula (XII):

$$v_i^{(n)} \square \text{ sign } (\Delta_i^{(n)}) \quad (XII),$$

in Formula (XII), $\Delta_i^{(n)} \square e_i^+ - e_i^-$, $e_i^+ \square |y_{c^+}^{(n)}|_2^2$, $e_i^- \square |y_{c^-}^{(n)}|_2^2$, $\forall i$, $v^{(n)} = [v_1^{(n)}, v_2^{(n)}, \ldots, v_q^{(n)}]^T$ is an aggregation value vector for each user recovered at the receiver, and $y_{c^+}^{(n)}$ and $y_{c^-}^{(n)}$ are superimposed symbols of given i at the receiver.

6. The dynamic power control method for resisting multi-user parameter biased aggregation in federated learning according to claim 1, wherein in step (5), after being received, the aggregation value of gradient signs of federated learning training is transmitted back to each user, and each user uses the aggregation value to update a current federated learning system model via gradient descent based on the following equation, namely Formula (XIII):

$$w^{(n+1)} = w^{(n)} - \delta v^{(n)} \quad (XIII),$$

wherein $w^{(n+1)}$ is the federated learning system model parameter vector of the $n+1^{th}$ communication, δ is the learning rate, $w^{(n)}$ is the federated learning system model parameter vector of the $n^{th}$ communication, and Formula (XIII) is continuously repeated until a predetermined convergence criterion is reached.

7. The dynamic power control method for resisting multi-user parameter biased aggregation in federated learning according to claim 1, wherein comprises a computer device that comprising a memory and a processor, the memory storing a computer program, wherein the processor, when executing the computer program, implements the steps of the dynamic power control method for resisting multi-user parameter biased aggregation in federated learning.

8. The dynamic power control method for resisting multi-user parameter biased aggregation in federated learning according to claim 1, wherein comprises a computer-readable storage medium, having stored thereon a computer program, wherein the computer program, when executed by a processor, implements the steps of the dynamic power control method for resisting multi-user parameter biased aggregation in federated learning.

9. A dynamic power control system for resisting multi-user parameter biased aggregation in federated learning, comprising:

a federated learning system model establishment module, configured to establish a federated learning system model for resisting parameter biased aggregation;

an objective function construction module, configured to construct a corresponding objective function based on a training purpose of the federated learning system model;

an over-the-air computation communication model determination module, configured to introduce, according to the established federated learning system model, a power control factor for resisting user biased gradient aggregation, and determine a corresponding over-the-air computation communication model;

a signal processing module, configured to process the signal by the receivers using the non- coherent energy detection method without cooperation between the receivers and the transmitters; and a dynamic power control module, configured to determine a federated learning security mechanism method based on resistance against parameter biased aggregation, and complete an updating training process of the federated learning system model, wherein the dynamic power control factor $Pr_k^{(n)}$ for resisting biased gradient aggregation is introduced, and the over-the-air computation communication model is shown in (VI):

$$y_c^{(n)} = \sum_{k=1}^{K} \sqrt{Pr_k^{(n)}} h_{k,c}^{(n)} t_{k,c}^{(n)} + n_{k,c}^{(n)}, \quad (VI)$$

in Formula (VI), $t_{k,c}^{(n)}$ is the sign transmitted at the $k^{th}$ user, $h_{k,c}^{(n)}$ is the channel coefficient between the edge server and the $k^{th}$ user, $h_{k,c}^{(n)} \square CN(0,1)$, $t_{k,c}^{(n)} \in \square$ is the transmitted sign from the $k^{th}$ user, $n_{k,c}^{(n)}$ is an AWGN with a zero mean and variance $\sigma_n^2$, $c \in \{0,1, \ldots, R-1\}$, and the transmitted signal power of the $k^{th}$ user at a server is set as the introduced dynamic power control factor $Pr_k^{(n)}$;

in the over-the-air computation communication model, the communication process comprises the following specific implementation steps:

at the transmitter, mapping $i \in \{1,2, \ldots, q\}$ to different symbols during pre-processing, q being the number of vector parameters, based on the value $\bar{g}_{k,i}^{(n)}$ in the $n^{th}$ communication cycle and transmitted symbols $t_{k,c^+}^{(n)}$ and $t_{k,c^-}^{(n)}$ at the $k^{th}$ user, $\forall i$ being shown in Formula (VII) and Formula (VIII):

$$t_{k,c^+}^{(n)} = \begin{cases} \sqrt{E_s} \times s_{k,i}^{(n)}, & \bar{g}_{k,i}^{(n)} = 1 \\ 0, & \bar{g}_{k,i}^{(n)} = -1 \end{cases}, \quad (VII)$$

$$t_{k,c^-}^{(n)} = \begin{cases} \sqrt{E_s} \times s_{k,i}^{(n)}, & \bar{g}_{k,i}^{(n)} = 1 \\ 0, & \bar{g}_{k,i}^{(n)} = -1 \end{cases} \quad (VIII)$$

wherein $\sqrt{E}=1$ is to normalize the OFDM symbol energy, and $s_{k,i}^{(n)}$ is a randomized sign on a unit circle;

introducing the dynamic power control factor $Pr_k^{(n)}$ for resisting biased gradient aggregation, superimposed symbols $y_{c^+}^{(n)}$ and $y_{c^-}^{(n)}$ of given i at the receiver by setting the power configuration of each user being shown in Formula (IX) and Formula (X):

$$y_{c^+}^{(n)} = \sqrt{E_s} \sum_{\bar{g}_{k,i}^{(n)}=1} \sqrt{Pr_k^{(n)}} h_{k,c^+}^{(n)} t_{k,c^+}^{(n)} + n_{k,c^+}^{(n)}, \quad (IX)$$

$$y_{c^-}^{(n)} = \sqrt{E_s} \sum_{\bar{g}_{k,i}^{(n)}=1} \sqrt{Pr_k^{(n)}} h_{k,c^-}^{(n)} t_{k,c^-}^{(n)} + n_{k,c^-}^{(n)} \quad (X)$$

wherein in Formulas (IX) and (X), $h_{k,c^+}^{(n)}$ and $h_{k,c^-}^{(n)}$ are channel coefficients corresponding to two sub-carriers, and $n_{k,c^+}^{(n)}$ and $n_{k,c^-}^{(n)}$ are corresponding channel noises respectively;

a dynamic power control method implemented by the dynamic power control system is applied to a federated learning security mechanism system, the federated learning security mechanism system comprising K users, an edge server, S OFDM symbols, and R active sub-carriers;

each user is connected to a central server;

training data of all the users are set to be multi-label data from the same feature space, the total number of labels being L ;

each local data point of any user has the same type of label, local data of a marked data sample on the $k^{th}$ user is represented by $D_k$, $(x_l, y_l) \in D_k$, $x_l$ and $y_l$ represent the data sample and the corresponding label, respectively, and the sum of the local data of all the users is D , satisfying: $\Sigma_{k=1}^{K} D_k = D$.

\* \* \* \* \*